United States Patent
Ellis

(10) Patent No.: US 8,080,077 B1
(45) Date of Patent: Dec. 20, 2011

(54) DUST COLLECTOR SYSTEM

(76) Inventor: Mark G. Ellis, Palm Harbor, FL (US)

( * ) Notice: Subject to any disclaimer, the term of this patent is extended or adjusted under 35 U.S.C. 154(b) by 682 days.

(21) Appl. No.: 12/228,565

(22) Filed: Aug. 14, 2008

(51) Int. Cl.
- *B01D 50/00* (2006.01)
- *B01D 47/16* (2006.01)
- *B23B 47/00* (2006.01)
- *B23B 45/02* (2006.01)
- *B23B 45/14* (2006.01)
- *B25D 17/22* (2006.01)

(52) U.S. Cl. ............. 55/385.1; 55/357; 55/383; 55/418; 55/428; 96/320; 15/339; 15/347; 15/352; 408/58; 408/67; 408/75; 408/76; 408/103; 408/241 G

(58) Field of Classification Search ................. 96/4, 320; 55/385.1, 418, 428, DIG. 3, 357, 383; 408/58, 408/67, 75, 76, 103, 241 G; 15/339, 347, 15/352, 353
See application file for complete search history.

(56) References Cited

U.S. PATENT DOCUMENTS

| | | | |
|---|---|---|---|
| 2,596,670 A | | 5/1952 | Francis |
| 3,162,066 A | * | 12/1964 | Morey et al. ................ 408/76 |
| 5,807,034 A | * | 9/1998 | Perlmutter et al. ............ 408/67 |
| 5,987,698 A | * | 11/1999 | Koenig et al. .................. 15/339 |
| 6,053,674 A | | 4/2000 | Thompson |
| 6,296,426 B1 | * | 10/2001 | King et al. ..................... 408/76 |
| D499,002 S | * | 11/2004 | Troxell ........................... D8/70 |
| 6,830,113 B2 | | 12/2004 | Moore |
| 6,851,900 B2 | * | 2/2005 | Tillemans et al. ............. 408/76 |
| 7,168,894 B2 | * | 1/2007 | Hansson et al. ................ 408/58 |
| 7,175,371 B2 | * | 2/2007 | Vidal .............................. 408/67 |
| 7,182,150 B2 | | 2/2007 | Grossman |
| 7,406,758 B2 | * | 8/2008 | Jones et al. ..................... 408/76 |
| D589,318 S | * | 3/2009 | Meyer ............................. D8/70 |
| D632,941 S | * | 2/2011 | Noniewicz ...................... D8/70 |
| 2008/0219785 A1 | * | 9/2008 | Urban et al. .................... 408/76 |
| 2009/0320820 A1 | * | 12/2009 | Sinisi ............................. 408/56 |

FOREIGN PATENT DOCUMENTS

| | | | |
|---|---|---|---|
| EP | 1 767 323 A2 | * | 3/2007 |
| FR | 2 924 959 | * | 6/2009 |
| GB | 2 450 529 A | * | 12/2008 |
| WO | WO 96/30147 | * | 10/1996 |
| WO | WO 2006/131311 A1 | * | 12/2006 |

* cited by examiner

*Primary Examiner* — Jason M Greene

(57) ABSTRACT

A vacuum assembly has a vacuum housing. The vacuum housing has lower and upper ends. The vacuum housing has a cylindrical wall adapted to secure the system onto a work surface. An enclosure assembly has an enclosure housing. The enclosure housing has lower and upper ends. The enclosure housing has a cylindrical wall. The upper end has two semi-circular closure panels. The panels have hinges. The panels are adapted to cover the upper end. The panels having mating semi-circular recesses. In this manner a passageway is formed. A horizontal membrane couples the vacuum and enclosure housings.

1 Claim, 3 Drawing Sheets

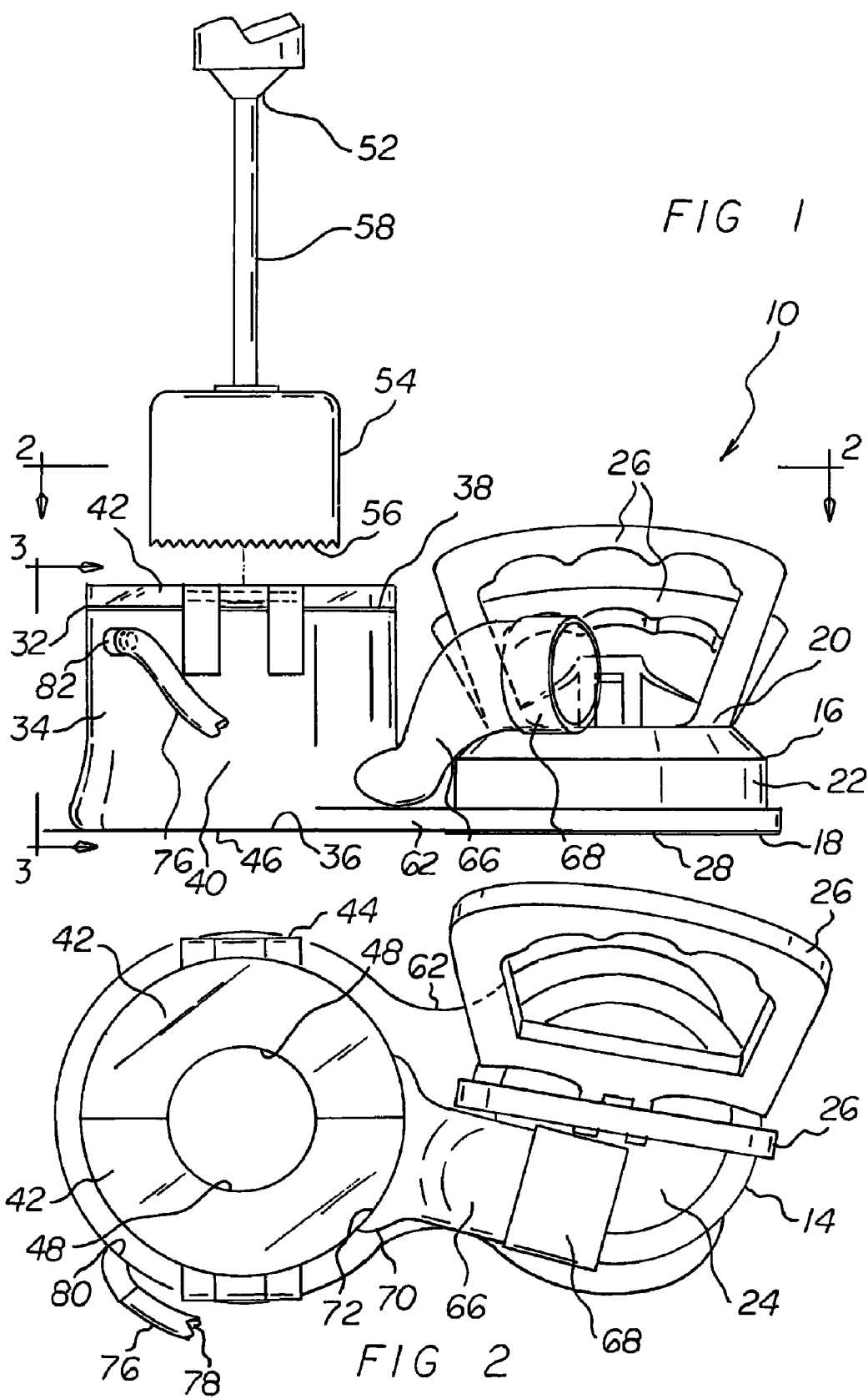

DUST COLLECTOR SYSTEM

BACKGROUND OF THE INVENTION

1. Field of the Invention

The present invention relates to a dust collector system and more particularly pertains to conducting away and collecting dust and other debris created while drilling a work surface with a hole saw, all in a safe, convenient, economical, non-toxic and ecologically friendly manner.

2. Description of the Prior Art

The use of drilling tool accessories of known designs and configurations is known in the prior art. More specifically, drilling tool accessories of known designs and configurations previously devised and utilized for the purpose of collecting dust and debris through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 2,596,670 issued May 13, 1952 to Francis relates to a Dust Collector. U.S. Pat. No. 6,053,674 issued Apr. 25, 2000 to Thompson relates to a Dust Collector Assembly for Drilling Tools. U.S. Pat. No. 6,830,113 issued Dec. 14, 2004 to Moore relates to a Dust Suppression Guard. Lastly, U.S. Pat. No. 7,182,150 issued Feb. 27, 2007 to Grossman relates to a Cordless Hand Held Power Tool with Powered Accessory.

While these devices fulfill their respective, particular objectives and requirements, the aforementioned patents do not describe a dust collector system that allows for conducting away and collecting dust and other debris created while drilling a work surface with a hole saw, all in a safe, convenient, economical, non-toxic and ecologically friendly manner.

In this respect, the dust collector system according to the present invention substantially departs from the conventional concepts and designs of the prior art, and in doing so provides an apparatus primarily developed for the purpose of conducting away and collecting dust and other debris created while drilling a work surface with a hole saw, all in a safe, convenient, economical, non-toxic and ecologically friendly manner.

Therefore, it can be appreciated that there exists a continuing need for a new and improved dust collector system which can be used for conducting away and collecting dust and other debris created while drilling a work surface with a hole saw, all in a safe, convenient, economical, non-toxic and ecologically friendly manner. In this regard, the present invention substantially fulfills this need.

SUMMARY OF THE INVENTION

In view of the foregoing disadvantages inherent in the known types of drilling tool accessories of known designs and configurations now present in the prior art, the present invention provides an improved dust collector system. As such, the general purpose of the present invention, which will be described subsequently in greater detail, is to provide a new and improved dust collector system and method which has all the advantages of the prior art and none of the disadvantages.

To attain this, the present invention essentially comprises a dust collector system. First provided is a vacuum assembly. The vacuum assembly has a vacuum housing. The vacuum housing has a lower end. The vacuum housing has an upper end. The vacuum housing has a cylindrical wall. The cylindrical wall is provided between the upper and lower ends. The upper end is closed. The upper end has a diaphragm. The upper end also has operator controlled pivotal handles. The lower end is open. The lower end has a free sealing edge. The free sealing edge is positionable on the work surface adjacent to a location on the work surface. In this manner a hole may be drilled by a hole saw. The handles are adapted to be controlled by an operator. In this manner pivoting the handles in a first direction will vacuum secure the vacuum assembly and system onto the work surface. Further in this manner pivoting the handles in a second direction will release the vacuum securement.

An enclosure assembly is provided. The enclosure assembly has an enclosure housing. The enclosure housing has a lower end. The enclosure housing has an upper end. The enclosure housing has a cylindrical wall. The cylindrical wall is provided between the upper and lower ends. The upper end has two semi-circular closure panels. Each panel has a hinge. The hinge couples the panels to opposite sides of the upper end. The panels are adapted to be controlled by an operator. In this manner pivoting the panels in a first direction will essentially cover the upper end. Further in this manner pivoting the panels in a second direction will uncover the upper end. The lower end is open. The lower end has a free edge. The free edge is positionable on the work surface. The free edge encompasses a location on the work surface to have a hole drilled. The panels have mating semi-circular recesses. The recesses for a passageway when the panels are pivoted. In this manner the upper end is covered. Elastomeric rings are coupled to the upper and lower ends of cylindrical wall of the enclosure housing for creating a pneumatic seal during operation and use.

Provided next is a hole saw. The hole saw has a cylindrical bit. The cylindrical bit has downwardly facing teeth. The diameter of the cylindrical bit is less than the diameter of the cylindrical enclosure housing. The axial length of the cylindrical bit is less than the axial length of the cylindrical enclosure housing. The hole saw has a rotatable shaft. The shaft has a lower end. The lower end of the shaft is coupled to the bit. The shaft has an upper end. The upper end of the shaft is adapted to couple to a source of rotary power. An intermediate section extends through the passageway through the covers.

A horizontal membrane is provided next. The horizontal membrane couples the lower ends of the vacuum and enclosure housings.

Further provided is an air line. The air line has an exterior cuff. The exterior cuff is adapted to be coupled to a source of negative air pressure. The air line has interior end. The air line also has an oval aperture. The oval aperture is provided in the cylindrical wall of the enclosure chamber. The interior end of the air line is coupled to the oval aperture.

Provided last is a liquid supply line. The liquid supply line has an exterior end. The exterior end is adapted to be coupled to a supply of liquid. The liquid supply line has an interior end. The liquid supply line has a circular aperture. The circular aperture is provided in the cylindrical wall of the enclosure chamber. The interior end of the liquid supply line is coupled to the circular aperture.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved dust collector system which has all of the advantages of the prior art drilling tool accessories of known designs and configurations and none of the disadvantages.

It is another object of the present invention to provide a new and improved dust collector system which may be easily and efficiently manufactured and marketed.

It is further object of the present invention to provide a new and improved dust collector system which is of durable and reliable constructions.

An even further object of the present invention is to provide a new and improved dust collector system which is susceptible of a low cost of manufacture with regard to both materials and labor, and which accordingly is then susceptible of low prices of sale to the consuming public, thereby making such dust collector system economically available to the buying public.

Even still another object of the present invention is to provide a dust collector system for conducting away and collecting dust and other debris created while drilling a work surface with a hole saw, all in a safe, convenient, economical, non-toxic and ecologically friendly manner.

Lastly, it is an object of the present invention to provide a new and improved dust collector system. A vacuum assembly has a vacuum housing. The vacuum housing has lower and upper ends. The vacuum housing has a cylindrical wall adapted to secure the system onto a work surface. An enclosure assembly has an enclosure housing. The enclosure housing has lower and upper ends. The enclosure housing has a cylindrical wall. The upper end has two semi-circular closure panels. The panels have hinges. The panels are adapted to cover the upper end. The panels having mating semi-circular recesses. In this manner a passageway is formed. A horizontal membrane couples the vacuum and enclosure housings.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of a dust collector system 10 constructed in accordance with the principles of the present invention.

FIG. 2 is a plan view of the system taken along line 2-2 of FIG. 1.

The same reference numerals refer to the same parts throughout the various Figures.

DESCRIPTION OF THE PREFERRED EMBODIMENT

Figure 3:
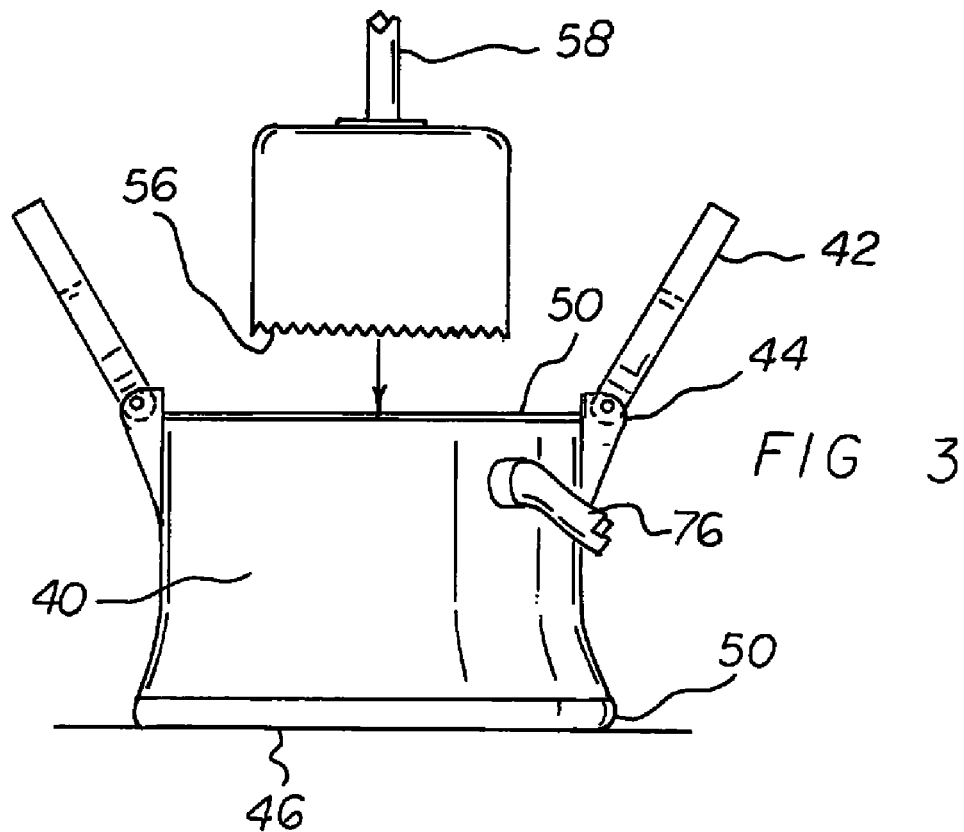
FIG. 3 is a side elevational view of the system taken along line 3-3 of FIG. 1.
Figure 4:
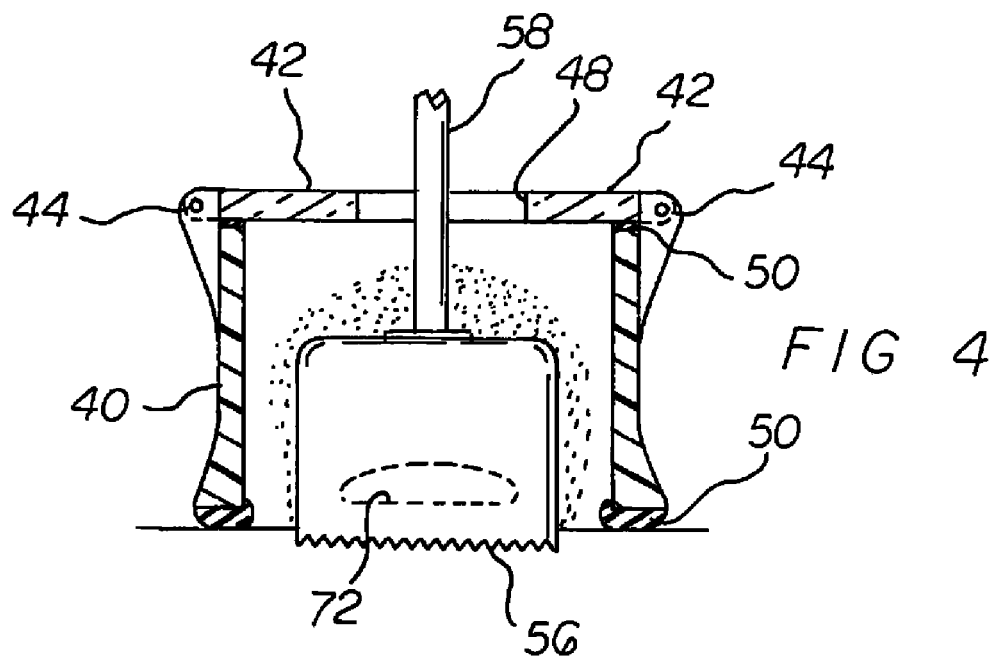
FIG. 4 is a cross sectional view of the saw blade and saw housing during operation and use.

With reference now to the drawings, and in particular to FIG. 1 thereof, the preferred embodiment of the new and improved dust collector system embodying the principles and concepts of the present invention and generally designated by the reference numeral 10 will be described.

The present invention, the dust collector system 10 is comprised of a plurality of components. Such components in their broadest context include a vacuum assembly, an enclosure assembly and a horizontal membrane. Such components are individually configured and correlated with respect to each other so as to attain the desired objective.

First provided is a vacuum assembly 14. The vacuum assembly has a vacuum housing 16. The vacuum housing has a lower end 18. The vacuum housing has an upper end 20. The vacuum housing has a cylindrical wall 22. The cylindrical wall is provided between the upper and lower ends. The upper end is closed. The upper end has a diaphragm 24. The upper end also has operator controlled pivotal handles 26. The lower end is open. The lower end has a free sealing edge 28. The free sealing edge is positionable on the work surface adjacent to a location on the work surface. In this manner a hole may be drilled by a hole saw. The handles are adapted to be controlled by an operator. In this manner pivoting the handles in a first direction will vacuum secure the vacuum assembly and system onto the work surface. Further in this manner pivoting the handles in a second direction will release the vacuum securement.

An enclosure assembly 32 is provided. The enclosure assembly has an enclosure housing 34. The enclosure housing has a lower end 36. The enclosure housing has an upper end 38. The enclosure housing has a cylindrical wall 40. The cylindrical wall is provided between the upper and lower ends. The upper end has two semi-circular closure panels 42. Each panel has a hinge 44. The hinge couples the panels to opposite sides of the upper end. The panels are adapted to be controlled by an operator. In this manner pivoting the panels in a first direction will essentially cover the upper end. Further in this manner pivoting the panels in a second direction will uncover the upper end. The lower end is open. The lower end has a free edge 46. The free edge is positionable on the work surface. The free edge encompasses a location on the work surface to have a hole drilled. The panels have mating semi-circular recesses 48. The recesses for a passageway when the panels are pivoted. In this manner the upper end is covered. Elastomeric rings 50 are coupled to the upper and lower ends of cylindrical wall of the enclosure housing. Such rings function as seals for creating a pneumatic seal during operation and use.

Provided next is a hole saw 52. The hole saw has a cylindrical bit 54. The cylindrical bit has downwardly facing teeth 56. The diameter of the cylindrical bit is less than the diameter of the cylindrical enclosure housing. The axial length of the cylindrical bit is less than the axial length of the cylindrical enclosure housing. The hole saw has a rotatable shaft 58. The shaft has a lower end. The lower end of the shaft is coupled to the bit. The shaft has an upper end. The upper end of the shaft is adapted to couple to a source of rotary power. An intermediate section extends through the passageway through the covers.

A horizontal membrane 62 is provided next. The horizontal membrane couples the lower ends of the vacuum and enclosure housings.

Further provided is an air line 66. The air line has an exterior cuff 68. The exterior cuff is adapted to be coupled to a source of negative air pressure. The air line has interior end 70. The air line also has an oval aperture 72. The oval aperture is provided in the cylindrical wall of the enclosure chamber. The interior end of the air line is coupled to the oval aperture.

Provided last is a liquid supply line 76. The liquid supply line has an exterior end 78. The exterior end is adapted to be coupled to a supply of liquid. The liquid supply line has an interior end 80. The liquid supply line has a circular aperture 82. The circular aperture is provided in the cylindrical wall of the enclosure chamber. The interior end of the liquid supply line is coupled to the circular aperture.

Figure 5:
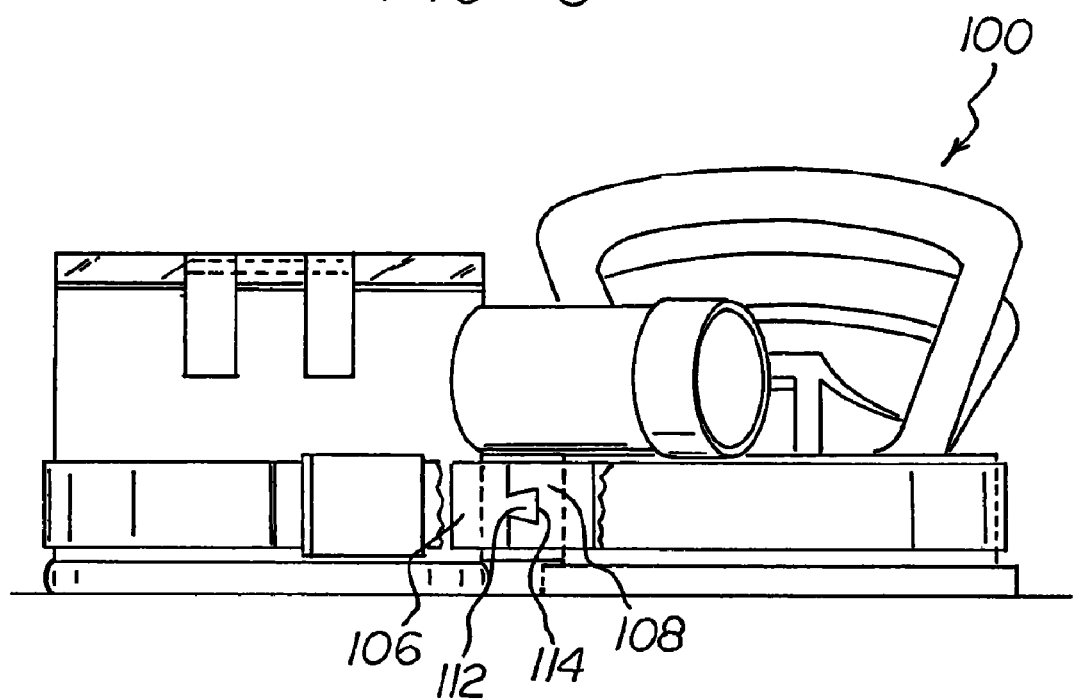
FIG. 5 is a FIG. 1 is a front elevational view of a dust collector system constructed in accordance with an alternate embodiment of the invention.
Figure 6:
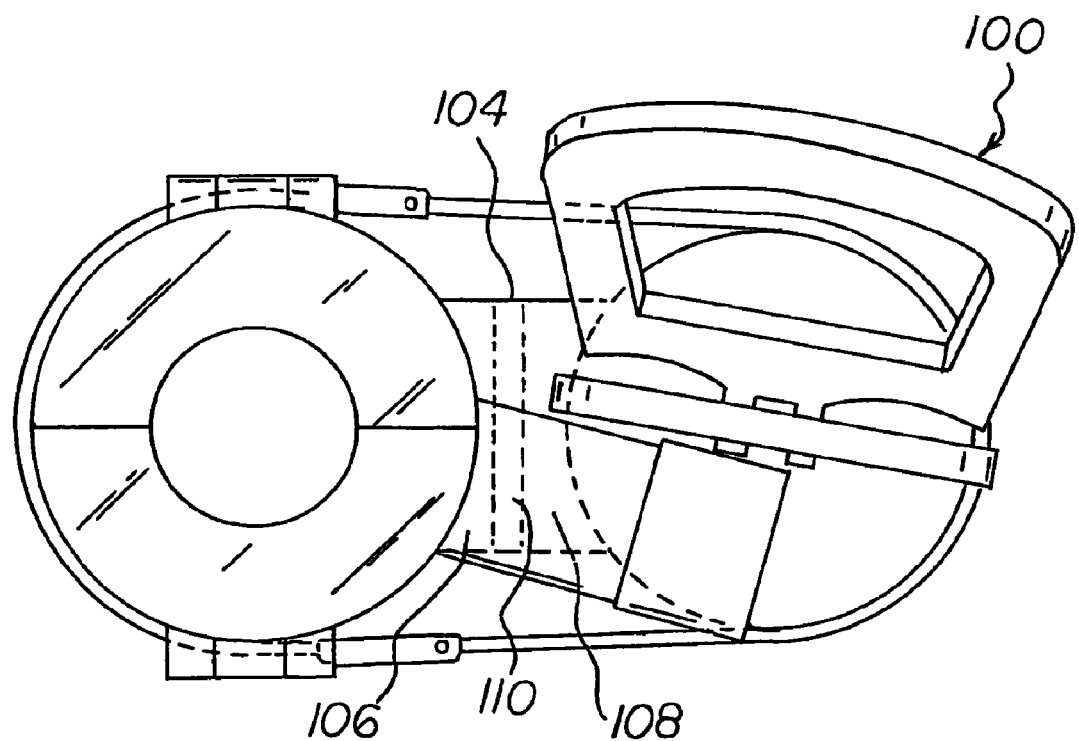
FIG. 6 is a plan view of the dust collector system illustrated in FIG. 5.

Note the alternate embodiment 100 of the invention illustrated in FIGS. 5 and 6. A horizontal membrane 104 is provided. The horizontal member has a first component 106. The first component is formed integrally with the vacuum housing. The horizontal member has a second component 108. The second component is formed integrally with the enclosure membranes. A connector 110 is provided. The connector has dove tail elements 112, 114. The dove tail elements separably connect the first and second components. In this manner any of a plurality of different sized vacuum housings is allowed to function with any of a plurality of different sized enclosure housings.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A dust collector system for conducting away and collecting dust and other debris created while drilling a work surface with a hole saw, all in a safe, convenient, economical, non-toxic and ecologically friendly manner, the system comprising, in combination:

a vacuum assembly having a vacuum housing with a lower end and an upper end and with a cylindrical wall between the upper and lower ends, the upper end being closed with a diaphragm and with operator controlled pivotal handles, the lower end being open with a free sealing edge positionable on the work surface adjacent to a location on the work surface to have a hole drilled by a hole saw, the handles adapted to be controlled by an operator whereby pivoting the handles in a first direction will vacuum secure the vacuum assembly and system onto the work surface and whereby pivoting the handles in a second direction will release the vacuum securement;

an enclosure assembly having an enclosure housing with a lower end and an upper end and with a cylindrical wall between the upper and lower ends, the upper end having two semi-circular closure panels, each panel having a hinge for coupling to opposite sides of the upper end, the panels adapted to be controlled by an operator whereby pivoting the panels in a first direction will essentially cover the upper end and whereby pivoting the panels in a second direction will uncover the upper end, the lower end being open with a free edge positionable on the work surface encompassing a location on the work surface to have a hole drilled, the panels having mating semi-circular recesses for forming a passageway when the panels are pivoted to cover the upper end, elastomeric rings coupled to the upper and lower ends of cylindrical wall of the enclosure housing for creating a pneumatic seal during operation and use;

a hole saw having a cylindrical bit formed with downwardly facing teeth, the diameter of the cylindrical bit being less than the diameter of the cylindrical enclosure housing, the axial length of the cylindrical bit being less than the axial length of the cylindrical enclosure housing, the hole saw having a rotatable shaft with a lower end coupled to the bit and an upper end adapted to couple to a source of rotary power with an intermediate section extending through the passageway through the covers;

the lower ends of the vacuum and enclosure assemblies being in a common horizontal plane and in contact with the work surface to be drilled;

a horizontal membrane coupling the lower ends of the vacuum and enclosure assemblies;

an air line with an exterior cuff adapted to be coupled to a source of negative air pressure and an interior end, an oval aperture in the cylindrical wall of the enclosure chamber with the interior end of the air line coupled to the oval aperture; and a liquid supply line with an exterior end adapted to be coupled to a supply of liquid and an interior end, a circular aperture in the cylindrical wall of the enclosure chamber with the interior end of the liquid supply line coupled to the circular aperture.

\* \* \* \* \*